Feb. 15, 1949.　　　　　P. ROWAN　　　　　2,461,776
SHAVING BRUSH HEATING MEANS
Filed Sept. 4, 1945　　　　　　　　　　　2 Sheets-Sheet 1

INVENTOR.
Peyton Rowan
BY
Henry L. Jennings
ATTORNEY

Feb. 15, 1949.   P. ROWAN   2,461,776
SHAVING BRUSH HEATING MEANS
Filed Sept. 4, 1945   2 Sheets-Sheet 2

INVENTOR.
Peyton Rowan
BY Henry L. Jennings
ATTORNEY

Patented Feb. 15, 1949

2,461,776

UNITED STATES PATENT OFFICE 2,461,776

SHAVING BRUSH HEATING MEANS

Peyton Rowan, Anniston, Ala.

Application September 4, 1945, Serial No. 614,170

3 Claims. (Cl. 219—23)

1

This invention relates to a fountain shaving brush of the general type shown and claimed in my prior Patent No. 2,358,252, issued September 12, 1944, and has for an object the provision of a device of the character designated which shall include an electric heating element, a switch for completing the circuit through the heating element, and thermostatic means for opening the switch responsive to a predetermined temperature.

A further object of my invention is to provide electrical means for heating a fountain shaving brush which shall include a bracket in which the brush may be removably mounted, and a switch included in the bracket, together with thermostatic means for opening the switch when the contents of the brush reach a predetermined temperature.

In my prior patent aforesaid, there was disclosed and claimed a fountain shaving brush, including an electric heating element mounted in the brush for heating the contents thereof, but no means were included to prevent the overheating of the contents of the brush. While the brush of my prior patent is eminently satisfactory in operation, it was necessary in using the brush to open and close the circuit to the heating element manually, determining by trial when the required temperature was reached. In accordance with my present invention, I provide a wall bracket, including a support for the brush, and with electrical contact members detachably connecting with the terminals of the heating coil in the brush. Mounted in the bracket is a thermostatically controlled switch which is adapted to open upon a predetermined rise in temperature within the heating chamber associated with the switch. Accordingly, with my improved device herein disclosed, the brush may be placed in its supporting brackets, the switch to the heating element closed, and the switch will automatically open by the time the contents of the brush have acquired the required temperature.

Apparatus embodying features of my invention is illustrated in the accompanying drawings, forming a part of this application, in which Fig. 1 is a front elevational view, showing the brush in section;

2

Figure 4:
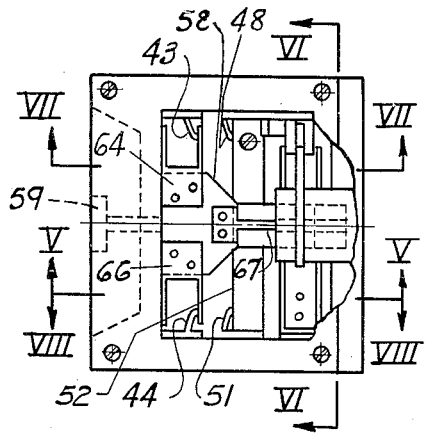
Fig. 4 is a plan view of the thermostatically controlled switch with the cover removed.
Figure 8:
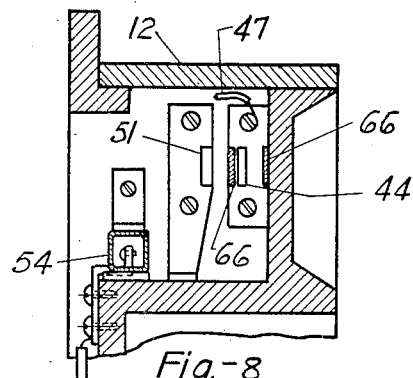

Fig. 8 is a sectional view taken along the lines VIII—VIII of Fig. 4; and

Figure 9:
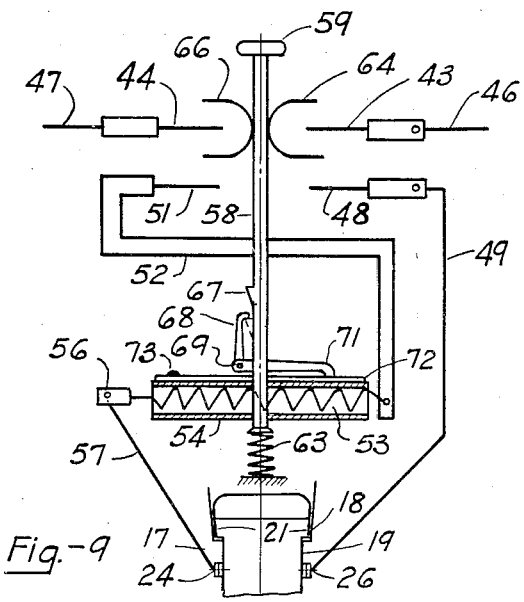

Fig. 9 is a wiring diagram illustrating the operation of the switch.

Figure 1:
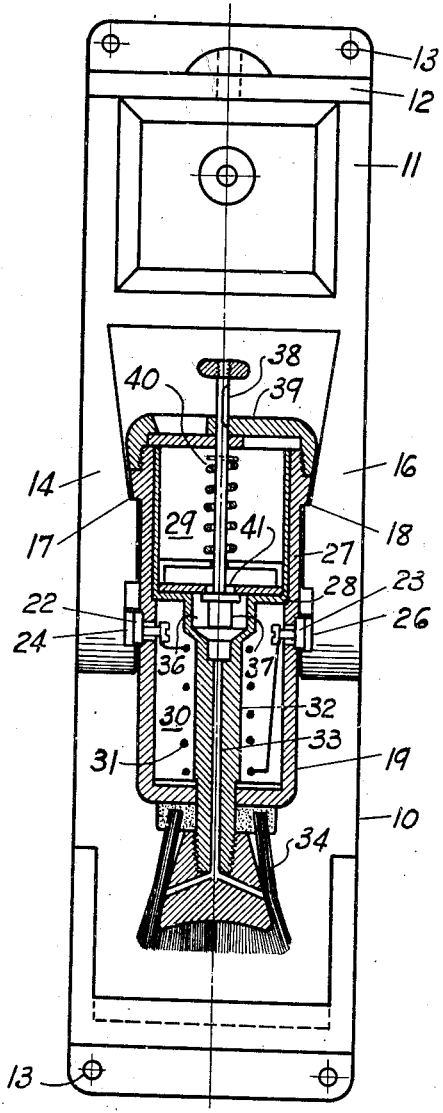
Figure 2:
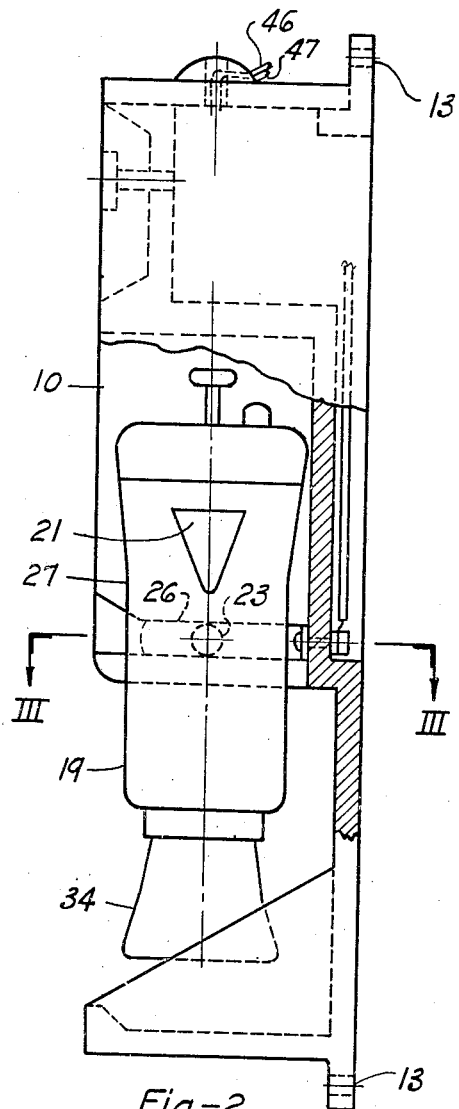
Fig. 2 is a side elevation, partly in section.
Figure 3:
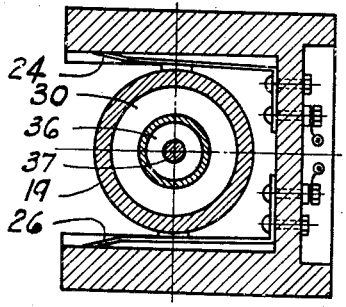
Fig. 3 is a sectional view taken along the lines III—III of Fig. 2.

Referring now to the drawings for a better understanding of my invention, I show in Figs. 1 and 2 a supporting bracket 10 including at its upper end a switch housing 11 with a removable cover 12. The bracket may be secured to the wall by means of screws entered through the holes 13. Beneath the switch housing 11, the bracket is open towards the front and is provided with side members 14 and 16 having inward projections 17 and 18. The brush is indicated at 19 and is provided with lateral shoulders 21 which rest upon the projections 17 and 18 when the brush is mounted in the bracket. The brush is provided on its sides with electrical contact members 22 and 23 which when the brush is in the position shown in Figs. 1 and 2, make contact with contact members 24 and 26 carried by the bracket 10.

The brush shown in the drawings hereto annexed is similar to the brush disclosed in my prior patent aforesaid. It comprises a handle 27 divided by a transverse partition 28 into a reservoir 29 for a soap mixture and a heating chamber 30. Located within the heating chamber 30 is an electrical heating element 31 connected to the contacts 22 and 23. The heating element, or coil, 31 surrounds a feed tube 32 which connects the reservoir 29 with a brush element 34. The feed tube 32, as shown, is of relatively large diameter, and is provided with a narrow passage 33 through which the soap mixture flows to the brush, thereby providing for the accumulation of heat in the heating chamber. At the upper end of the feed tube 32 is a relatively small chamber 36 in which is located a combined valve and plunger 37 having a stem 38 which extends out through the cover 39 of the reservoir 29. A spring 40 biases the stem 38 outwardly so as to hold the valve member 37 on its seat. A passage 41 in the partition 28, controlled by the valve member 37, serves to admit soap mixture from the reservoir 29 into the chamber 36 from whence it is propelled through the feed tube 33 by reciprocation of the valve and plunger element 37. The mixture is heated during its passage through the feed tube 32, by the element 31.

Figure 5:
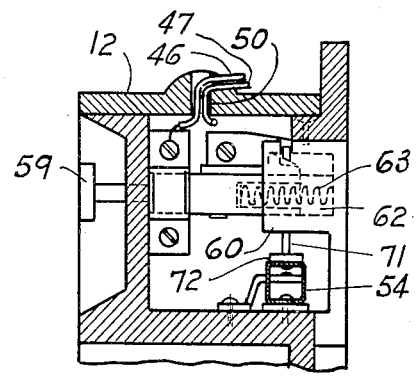
Fig. 5 is a section taken along the lines V—V of Fig. 4.
Figure 6:
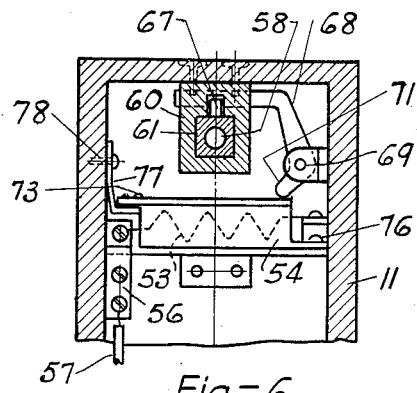
Fig. 6 is a sectional view taken along the lines VI—VI of Fig. 4.
Figure 7:
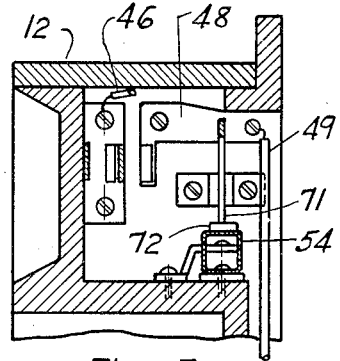
Fig. 7 is a sectional view taken along the lines VII—VII of Fig. 4.

Referring now particularly to Figs. 4 to 9 inclusive, my improved switch comprises stationary contact members 43 and 44, which are connected to a source of E. M. F. by wires 46 and 47, which may conveniently enter the housing 11 through an opening 50 in the cover 12. Disposed alongside the contact 43 is a stationary contact 48 connected to a wire 49 leading to the contact 26 in the side of the bracket heretofore described. Alongside the stationary contact 44 is another stationary contact 51 which is connected to a conducting member 52 which extends across the housing and is connected to a heating coil 53 mounted in a housing 54 extending across the housing 11. The heating coil is connected on its opposite end to a member 56 having connected thereto a wire 57 leading to the lateral contact 24 heretofore described. At 58 I show a reciprocable switch member extending out through the front of the housing 11 and having a push button 59 mounted on the outer end thereof. The member 58 is preferably rectangular in cross section as shown in Fig. 6 and is mounted in a bracket 60 in the housing 11, which has a corresponding opening 61 in which the member 58 fits. The inner end of the member 58 is hollow as shown in Figs. 5 and 6 to provide a housing 62 for a spring 63 mounted therein which serves to bias the member 58 outwardly of the housing 11. Carried by the member 58 is a U-shaped movable contact 64 which, when the member 58 is pushed inwardly, contacts with the contact members 43 and 48. Also carried by the member 58 is another U-shaped movable contact member 66, mounted opposite the member 64 and which is disposed to engage with the contacts 44 and 51 when the member 58 is pushed inwardly.

Carried by the member 58 is a latch member 67 which is so disposed as to be engaged by a trip member 68 pivotally mounted at 69 in the side of the casing 11. One end of the trip member 68, indicated by the numeral 71, extends over the housing 54 for the heating element 53. A bimetallic strip 72 is secured at 73 to one end of the housing 54 whereby, on becoming heated, the free end thereof rises and engages the end 71 of the trip member 68 to disengage it from the latch member 67. As will be seen from Fig. 6 of the drawings, the housing 54 is rigidly mounted at 76 on one side of the housing 11 while at the other end, it is connected by means of a flexible strip 77 to the side of the housing by means of a suitable fastener 78. It will also be seen that the housing 54 is somewhat shorter than the distance across the housing 11 whereby it may be free to expand and contract with changes in temperature.

From the foregoing description, the operation of a device constructed in accordance with my invention will be readily understood. The brush 19 is placed in position within the bracket 10, with the shoulders 21 resting upon the projections 17 and 18. In this position, the contacts 22 and 23 on the side of the brush 19 are in engagement with the contacts 24 and 26 carried by the brackets 14 and 16. The button 59 is pushed inwardly until the latch 67 is engaged by the trip member 68 which closes the switch, completing a circuit from the wire 46 through contacts 64 and 48 to wire 49 and the brush 19. The circuit continues through the heating element 31, wire 57, heating element 53, conductor 52, and contacts 51, 66 and 44 to the wire 47. As the heating element 53 raises the temperature of the housing 54, the bimetallic element 72 moves into engagement with the free end 71 of the trip member 68 releasing the latch 67, whereupon the spring 63 moves the switch to open position. By the time this occurs, the soap mixture in the reservoir 29 and the feed tube 32 are heated. The brush may then be lifted from its supports and used. When further heating is required, the brush is again placed in the bracket, and the push button 59 is pushed inwardly to complete the circuit heretofore described.

From the foregoing, it will be apparent that I have devised an improved electrical heating means for a fountain brush which is simple of construction, reliable of operation, and one which effects the required heating of the soap mixture in the brush safely and automatically.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. The combination with a fountain brush having a hollow handle with an electric heating element therein and having contact members for the element extending through the sides of the handle, together with a bracket for removably supporting the brush by its handle and having contact members disposed to engage the contact members on the handle of, a source of E. M. F., a switch carried by the bracket for connecting the source of E. M. F. and the contact members, a second heating element carried by the bracket and in circuit with the switch and the contact members, a spring carried by the bracket for biasing the switch toward open position, a latch for holding the switch closed, and means movable responsive to heat generated by the second heating element for disengaging the latch.

2. A device as set forth in claim 1 in which the switch comprises a reciprocable member, a latch on the reciprocable member, a trip member pivotally mounted in the bracket, and a bimetallic member mounted in heat transfer relation with the second heating element for actuating the trip member.

3. The combination with a fountain brush having a hollow handle with an electric heating element therein and having contact members for the element extending through the sides of the handle, together with a bracket for removably supporting the brush by its handle and having contact members disposed to engage the contact members on the handle of, a switch housing in the bracket, a switch mounted in the housing for connecting a source of E. M. F. with the contact members, a heating element in the switch housing in series with the contact members and the switch, a manually operable reciprocable member for closing the switch, a spring for opening the switch, a latch for holding the member with the switch in closed position, a pivotally mounted trip member for releasing the latch, and a member mounted in the switch housing in heat transfer relation with the heating element therein and movable responsive to a rise in temperature to actuate the trip member.

PEYTON ROWAN.

REFERENCES CITED

The following references are of record in the file of this patent:

UNITED STATES PATENTS

| Number | Name | Date |
| --- | --- | --- |
| 1,247,484 | Albrecht | Nov. 20, 1917 |
| 1,270,304 | Kuhn et al. | June 25, 1918 |
| 1,550,334 | Baxter | Aug. 2, 1922 |
| 2,114,026 | Mayer | Aug. 8, 1936 |